United States Patent [19]

Guthrie et al.

[11] 3,772,501

[45] Nov. 13, 1973

[54] UNIVERSAL INFORMATION STORE, METHOD, AND APPARATUS

[75] Inventors: David E. Guthrie, La Mirada; Arthur D. Swain, Alhambra, both of Calif.

[73] Assignee: Saber Management Systems, Inc., Riverside, Calif.

[22] Filed: Dec. 21, 1970

[21] Appl. No.: 99,941

[52] U.S. Cl. .............................................. 235/61.11
[51] Int. Cl. .............................................. G06k 7/00
[58] Field of Search .............. 235/61.12 R, 61.11 E, 235/61.11 R

[56] References Cited

UNITED STATES PATENTS

| | | | |
|---|---|---|---|
| 3,359,985 | 12/1967 | Luscher | 235/61.12 R |
| 3,418,119 | 12/1968 | Schwartz | 235/61.12 R |
| 3,193,665 | 7/1965 | Bonnar | 235/61.12 R |

FOREIGN PATENTS OR APPLICATIONS

| | | | |
|---|---|---|---|
| 940,645 | 10/1946 | France | 235/61.12 |

OTHER PUBLICATIONS

Grant et al., "Distinguishing Classes of Data Using a Single Time Channel" IBM Tech. Disclosure, Vol. 8, No. 3, Aug. 1965, p. 355–356

*Primary Examiner*—Maynard R. Wilbur
*Assistant Examiner*—Jeremiah Glassman
*Attorney*—William G. Becker

[57] ABSTRACT

Information store comprising a pre-perforated and edge-notched device similar to a Hollerith information store, further contrived for mark-sensing of spatially-oriented mark-recorded information, with means for selectively utilizing a plurality of types of stored information retrieved from the device by the means and converted by the means into a single other type or form susceptible of direct use in any of a variety of known information-processing or information-utilizing means, and the mode of so storing and converting the information.

6 Claims, 5 Drawing Figures

INVENTORS
DAVID E. GUTHRIE,
ARTHUR D. SWAIN
BY
[signature]

INVENTORS
DAVID E. GUTHRIE,
ARTHUR D. SWAIN
BY

INVENTORS
DAVID E. GUTHRIE,
ARTHUR D. SWAIN
BY

INVENTORS
DAVID E. GUTHRIE,
ARTHUR D. SWAIN
BY
[signature]

UNIVERSAL INFORMATION STORE, METHOD, AND APPARATUS

BRIEF SUMMARY OF THE INVENTION

The invention comprises storing of information on a card that in the most extended or comprehensive aspect of the invention is one member of a manifold documentary device herein termed a set, in which there may be a plurality of carbon-copy or like duplicate members similar in shape or format to part or all of the card, the information being variously stored on the card and any accompanying manifold members of the set by edge-notching, optical marking, coded perforations and printing, representing one or more groups of informations encoded in one or more of known codes such as binary-coded-decimal (BCD), binary coded decimal interchange code (BCDIC) and Hollerith; and further the invention comprises a special card reader and utilization thereof for reading novel marking, edge perforations and/or notches and other recorded information and for transmission to information-utilizing means including coded-information translating means for decoding and re-encoding one or more portions or fields of the card-borne information into a coded form directly usable in an information-utilizing means or other information store, such as a flexowriter, magnetic tape, drum or disc file, or general or special purpose computer as may be desired. The invention further comprehends the several combinations of the novel information store means with the noted means for reading, translating, and utilizing or storing the retrieved information.

The novel information store, which is hereinafter designated a set, is in essence a pre-punched card, or a card with manifold papers, having therein an array of "location" perforations utilized for assuring proper orientation of the store or set relative to punching, notching, sorting or reading means, the set having one or more determined edge regions or fields arranged for coded notching and/or perforation, and further having other regions allocated for variously receiving information via a plurality of means from one or more sources, and further having therein one or more regions or fields variously perforated for production of operations-controlling signals, and one or more interior areal regions or fields to provide one or more fields for reception and storage of information by marking, perforating, and/or other known procedures. Thus the set, in use, ordinarily bears a pre-punched array of location perforations, one or more groups or sets of perforations for edge-notching, and one or more other bodies of information, and recorded information in the form of presence or absence of perforations in restricted areas and which areas control routing and disposition of information retrievable from the set. Edge notches within a field comprising one longitudinal edge of the set are usable, in conjunction with notchless areas in the field, in effecting manual sorting of sets or cards by means of a needle, in accord with a known mode of card sorting. Edge notches along the opposite longitudinal edge of the set or card may be utilized to contain information coded in binary form and/or for timing-mark purposes.

The set, or alternatively only the card if the set is comprised of only the card, is arranged to be read, in an information-retrieval operation, by either a static card reader or a dynamic card reader. As in known card-reading operations, when a static reader forms a part of the present apparatus combination, an electronic timing clock "steps" the reading action along the card, column after column; and when a dynamic reader is utilized, clocking is accomplished by means including card-contained clock signs which may be in the form of marks, perforations, notches or the like, the means including clock-circuit means intermittently pulsed incident to relative movement between the clock signs and a sign-sensing means. Further, prior to commencement of clocking (sensing of clock signs) the reader interrogates certain areas or regions at the leading end of the card or set, and thereby establishes a combination of information-disposition controlling signals which effect switching means for routing information as it is retrieved from the card and for effecting other controlling operations relative to reading of the card and disposition of the information read therefrom. Thus, for example, presence or absence of a pre-punched leading-end perforation in one location controls whether the reader will read columns of information encoded in decimal (Hollerith), or information encoded in BCD. Similarly, presence or absence of a pre-punched leading-end perforation at another selected location controls stopping of the reader and initiation of action of a typewriter. At still another leading-end location, presence or absence of a pre-punched aperture controls programming of the reader to read lower-edge notching of the card. Thus the card or set, in addition to having its main body devoted to storage of information in one or more fields (for example as in a Hollerith-type card), additionally comprises an initial or extra leading-end field containing information which serves to control disposition of information comprised in the main body of the store, and further additionally comprises upper and lower edge-notch fields which serve the dual purpose of containing coded information for reading by the electronic reader and permitting manual segregation of groups of sets by needle or saber. That is, the encoded information comprised in the upper and lower edge-notch fields serves a dual function, one of which, permitting manual sorting by needle, is old in the information-processing art, and the second of which is providing an additional field of information utilizable by automatic information-processing machinery.

As is made evident by the preceding summary, it is a specific object of the invention to facilitate storage, retrieval and utilization of information by provision of a specially-contrived information-store in the form of a device herein termed a set, which comprises at least an elongate card, the set having end fields, upper and lower edge fields, and a central body providing interior space divisible into one or more fields for receiving and storing information by one or more of known modes.

It is a general object of the invention to provide means for effecting improvements in the art of recording and translating or processing information.

It is another object of the invention to provide an improved combination of information-store means and means for retrieving and processing information stored in the store.

It is another object of the invention to provide means for facilitating the storing of information.

It is an additional object of the invention to provide means for concurrently retrieving and translating into a single coded form, information stored in a variety of binary coded forms in a single information store herein called a set.

It is an additional object to provide a new information store capable of containing a variety of types of information recorded in respective different forms and optionally at different locations and capable of being concurrently retrieved by a retrieval means common to the several types of record in the store.

Other objects and advantages of the invention are hereinafter set out or made evident in the appended claims and the following detailed description relating to the preferred exemplary form of the invention as illustrated in the accompanying drawings forming part of this disclosure.

DETAILED DESCRIPTION OF THE INVENTION

Figure 1:
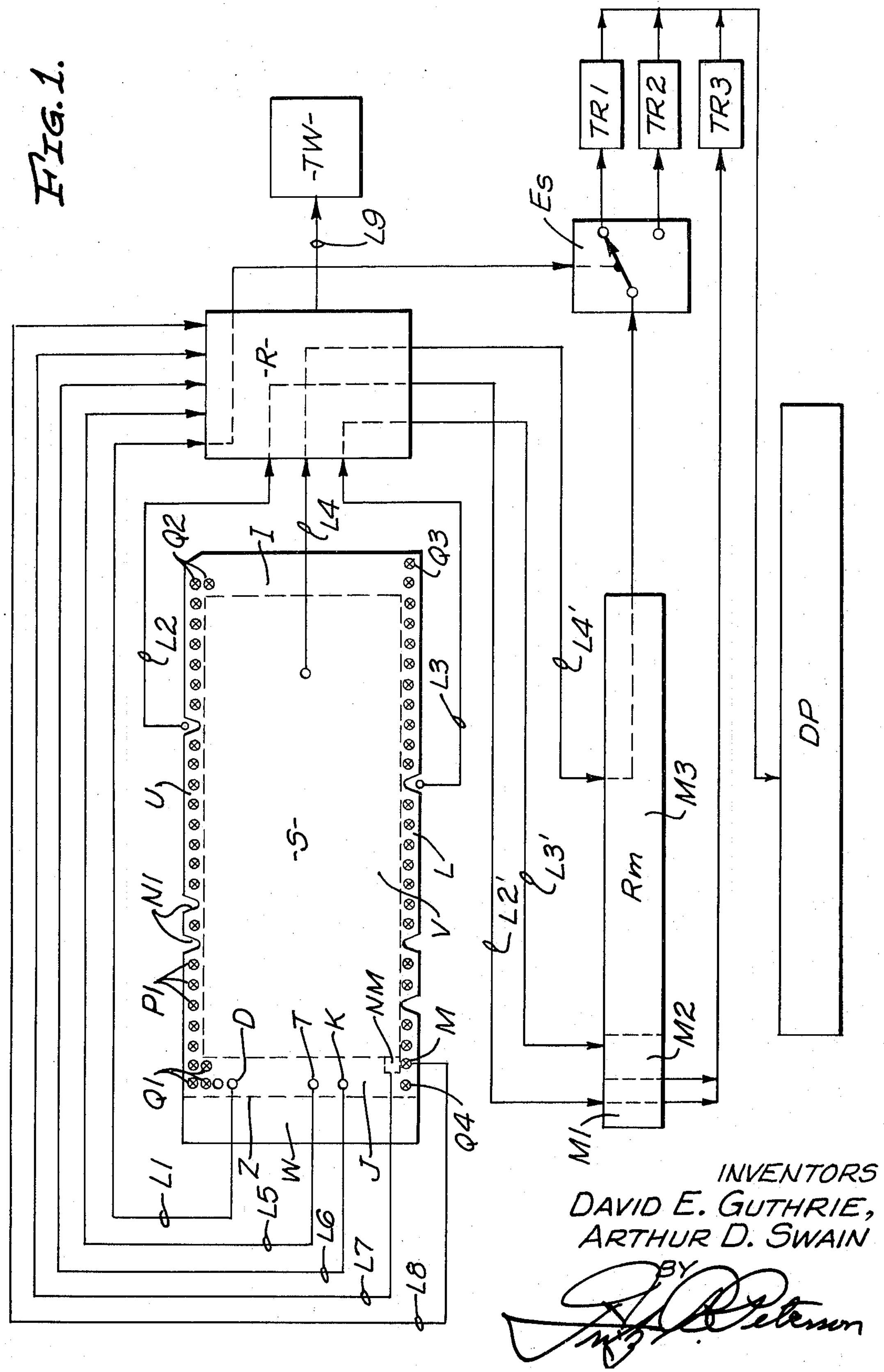
FIG. 1 is a partly diagrammatic representation of the face of an exemplary information-store or set according to the invention, a device for retrieving information carried by the set, switching means controlled by the set, coded-information translating means, and information-utilizing means, and diagrammatically represented functional interconnections between certain of the noted components of the exemplary system.

Referring first to FIG. 1, an information-store according to the invention comprises a set S of one or more flexible sheet-like members of rectangular form and of shape similar to a Hollerith card. Each member of the set is provided with a detachable end or marginal tab W which, in the case of the set comprising a plurality of members, is utilized to integrate into a single unit a relatively stiff flexible card and one or more relatively thin sheets of paper, for example, adapted for receiving handwritten, typewritten and/or printed information. The tab portion of any such member is demarked at its junction with the body portion of the member by a weakened line or Zone Z, which may be a line of perforations or the like, whereby the body portion of the member may be readily detached from the tab portion. The tab portion, or portions in the case of a multi-member set, is adapted to receive adhesive or staple or like fastening means for securing the several members into an integral unit capable of being variously handled and accommodated in punching means, etc., without disordering of the members of the set. The thin-sheet members of a set preferably overlie the stiffer card-like member; and preferably are formed from paper or the like having percussion-sensitive inking means therein whereby each member may have formed thereon and therein printed information by typewriter or flexowriter means without use of carbon paper.

In general, in the following description, it will be assumed that the set S comprises a card member such as C (FIG. 2), and one or more paper members such as C1, C2, C3 and C4 in coincident superposed relation with member C; and also that the several members of the set are similarly pre-printed and pre-punched with certain basic perforations for reasons hereinafter more fully stated. As will be made evident, however, certain novel features of the invention are independent of the number of members in the set S and are as well applicable to a set composed of only one card member as to a set comprising several members such as C, C1, C2, etc. The exemplary set S chosen for illustration of the invention comprises the five members noted, and a comprehensive description of features of the invention will make reference to such exemplary set. In the drawings a perforation is denoted by a circle enclosing a cross or X, and a perforation location by a circle or rectangle.

As is indicated in FIG. 1, the set S is composed or arranged to have an upper marginal area or region, herein termed an upper margin field, U, adapted to receive and store information represented by presence and absence of perforations such as P1, by presence and absence of edge notches such as N1, or by a combination of those features. The set similarly is arranged to have a lower marginal area or region termed a lower margin field, L, similarly adapted and arranged to receive and store information. Such information may be recorded or stored by means arranged for selective perforating and/or edge-notching; for example, by the means disclosed in U.S. Pat. No. 3,524,586, and by commercially available card-punching machines.

At the left end (hereinafter termed the leading end) of the body portion of the set S, a marginal area or field, J, is arranged and utilized for a plurality of functions including card-mispositioning detection or orientation control, and for information-translation control. Both of these functions will be further explained hereinafter. At the right, or trailing, end of the set, a second-end marginal area or field, I, is arranged for reception of information represented by presence and/or absence of perforations in specific assigned locations, the functions being in part to aid in preventing misorientation of the set, and in part for reception of other possible significant information.

The central area V, inwardly of the upper, lower and end marginal fields U, L, J and I of the set, is arranged alternatively for reception of information via optical marking, printing, perforating (punching) and/or combinations of two or more of those modes of information-storing. As an example of utilization of the region V for multiple-method storage of information in combination with that stored in marginal fields of the set, a composite of several such modes is illustrated in the set S'' in FIG. 3. In the latter, interior fields F1 and F6 are adapted for reception, respectively, of typed or printed information, and handwritten information, field F2 is arranged for reception by punching of information in binary coded decimal (BCD) form, field F3 is arranged for reception of punched-in information according to a known Hollerith or large well-known commercial alphanumeric system, field F4 is arranged for recording decimal information and field F5 is adapted to receive direct alphabetically-coded information.

Figure 3:
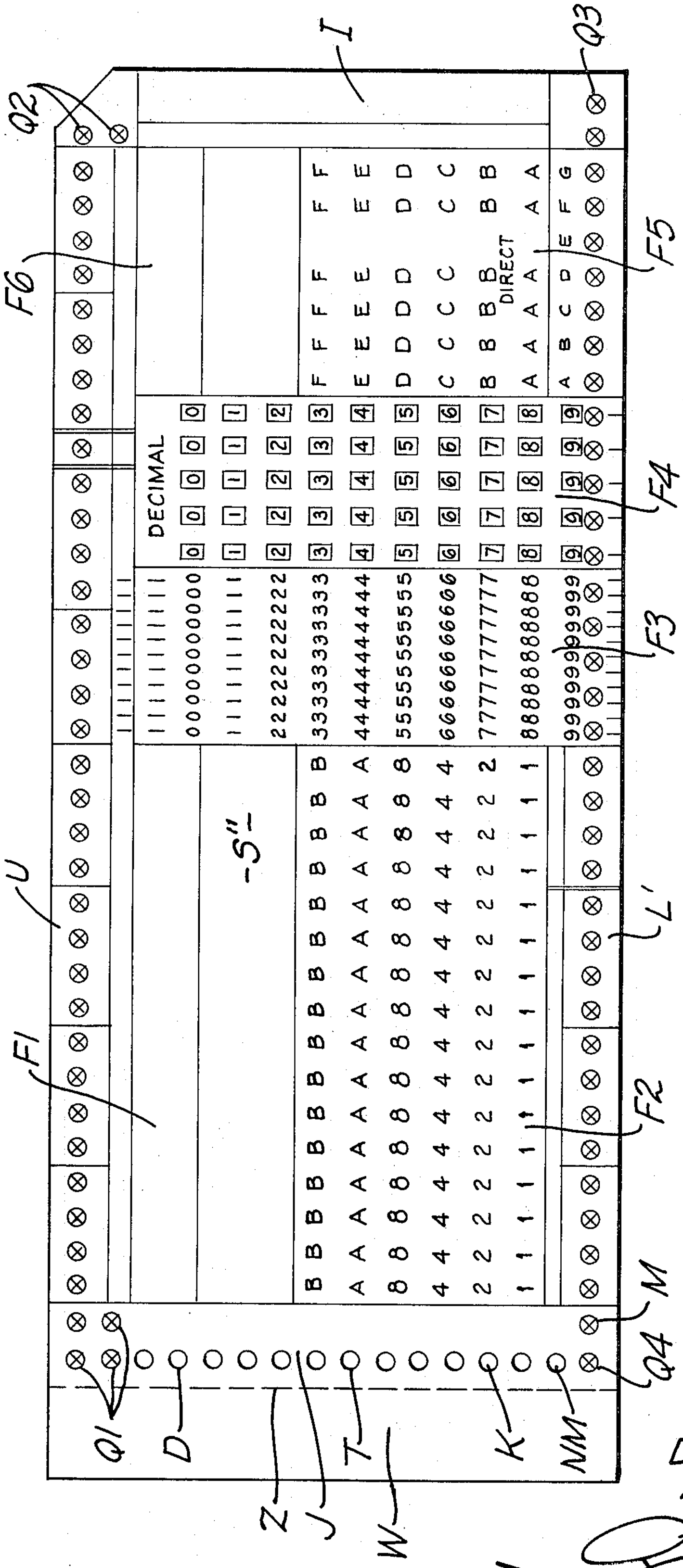
FIG. 3 is a plan view of a composite type of set according to the invention.

While the exact composite of information-storage forms or modes illustrated in FIG. 3 would seldom if ever be utilized in practice, it illustrates the possibilities of the set. Generally, information will be encoded in two or fewer of the indicated forms; but sets S of a variety of the forms are adapted for concurrent use according to the invention, each set having reading-controlling information in its J-field and thus permitting sequential reading of sets having information stored therein in respectively different forms. For example a group of sets S may be used in recording medical information in a hospital, each group being assigned to a respective department or unit such as admission unit, intensive-care unit, surgical unit, maternity unit, etc., and each group thus having a respective different format or form necessary for recording differing types of significant information in unique fields, together with information common to all, e.g., name and address of patient, age and sex, etc., in like fields. All of the groups of sets may be processed, that is, information retrieved and translated, etc., at a common station and by the same processing means, despite the differing field formats and types of information recorded. And all groups may be intermingled, and sorted by needle or saber means, for example, to retrieve all sets relating to only male patients; one, or two notch locations in the upper marginal field being devoted to recording sex of patients, for example. Similarly, a sub-field of the upper marginal (edge-notching) field U may be devoted, for example, to a record of the patient's age or age group. Thus it is evident that information may be recorded, by perforating and/or notching, in each of fields U and L to permit alternative manual or machine sorting of sets. Other information is adapted to be recorded in other fields and utilized, as will presently be described and illustrated.

In the preferred form of sets S, S′, S″, etc., as depicted in exemplary arrangements in the drawings, the punch areas indicated at Q1, Q2, Q3, and Q4 near the four corners of the set, are pre-punched alike in all sets and are utilized to prevent mis-orientation of the set in a reader, that, for position-control of the set. As will be evident upon examination, if reading means or pins are situate at the respective apertures at the noted areas, the set will be accommodated by the reader; but if the set is inverted in either direction, or rotated in its plane other than full turn the set will not be accommodated and the reader will be unable to proceed with reading the recorded information. Thus the group of apertures at Q1, etc. form a position-control key, and in cooperation with pin or like contact means or aperture-sensing circuit and logic means of a card reader or by means of testing by needle means, are effective to prevent reading of an improperly oriented set.

In the leading-end field J, the aperture location D is used to control translator action. Thus if an aperture is not present at location D, the reader and connected means will read or sense in BCD code (1, 2, 4, 8,A,B); whereas if an aperture is present, the reader and connected means will read in Hollerith code (1, 2, 3, – 8, 9, 0, 11, 12). Similarly, punch locations T and K (FIGS. 2 and 3) are devoted to typewriter and keyboard control. Thus if an aperture exists at T but none is present at K, the reader stops and activates a typewriter (whereby handwriting can be converted to typewriting on the appropriate field or area of the set). If an aperture exists at K but none is present at T, the reader stops and activates a keyboard for a keyboard input of additional information. If apertures exist at both of locations T and K, both the typewriter and keyboard are activated for input of additional information.

The leading-end field J further has an area or location NM (FIGS. 2 and 3), at which location all sets must present absence of a perforation if the reader is to function; that is, presence of an aperture at that location will stop the reader. Further, if an aperture is punched at field location M at the lower interior of field J, the margin field L contains information recorded by edge-notching, similar to notches shown at N′ in the lower marginal field and the reader is thereby programmed to read the lower edge notches in field L as well as to read the information in the interior field or fields denoted V in FIG. 1. If there is an edge-notch at location M in field J, the reader is thereby instructed to ignore (not read) the central field V, and to read edge-notch information recorded in field L.

Thus, it is evident that the information comprised in apertures, notches, or absence of apertures or notches, in certain selected locations in the leading-end field J, provides proof against mal-orientation of the set, and provides for control of disposition and handling of information comprised in marginal fields U and L and in the body field V of the set. These functions and information flow lines are schematically indicated by way of lines in FIG. 1. In that drawing the reader is represented by rectangle R; a device comprising a buffer memory, which memory may be comprised principally of shift registers, is denoted by Rm; an electronically controlled switch device is denoted by Es; a plurality of translation circuit means are denoted respectively by TR1, TR2 and TR3; and a digital information processing means, such as a general purpose computer or a disc or tape memory, is denoted by DP. Reader R may, for example, be such as is designated Saber Model 3600, produced commercially and sold by Automata Corporation, Richland, Washington. As is indicated in the drawing, information passes into the reader R from location D of field J as indicated by line L1 from upper margin field U as indicated by line L2; from lower margin field L as indicated by line L3; from central field V as indicated by line L4; and from special locations T, K, NM and M as indicated by lines L5, L6, L7 and L8 respectively. Information derived from locations D, T, K, NM and M is utilized by the reader for self-control and for control of devices such as the aforenoted electronic switch Es and typewriter and keyboard means all of which are collectively denoted TW, the control of TW being effected as indicated via line L9.

Figure 2:
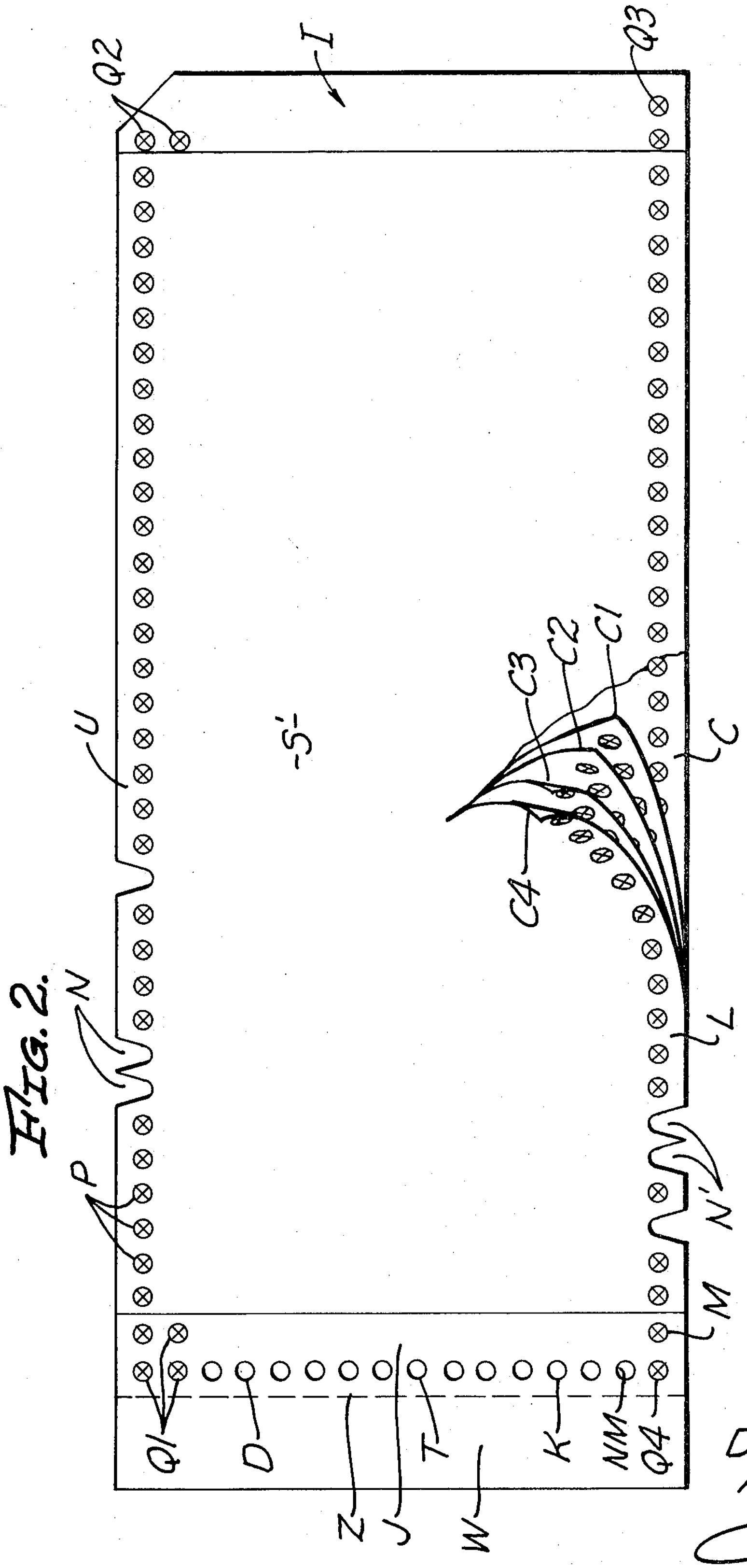
FIG. 2 is a plan view of a multi-member set according to the invention.
Figure 4:
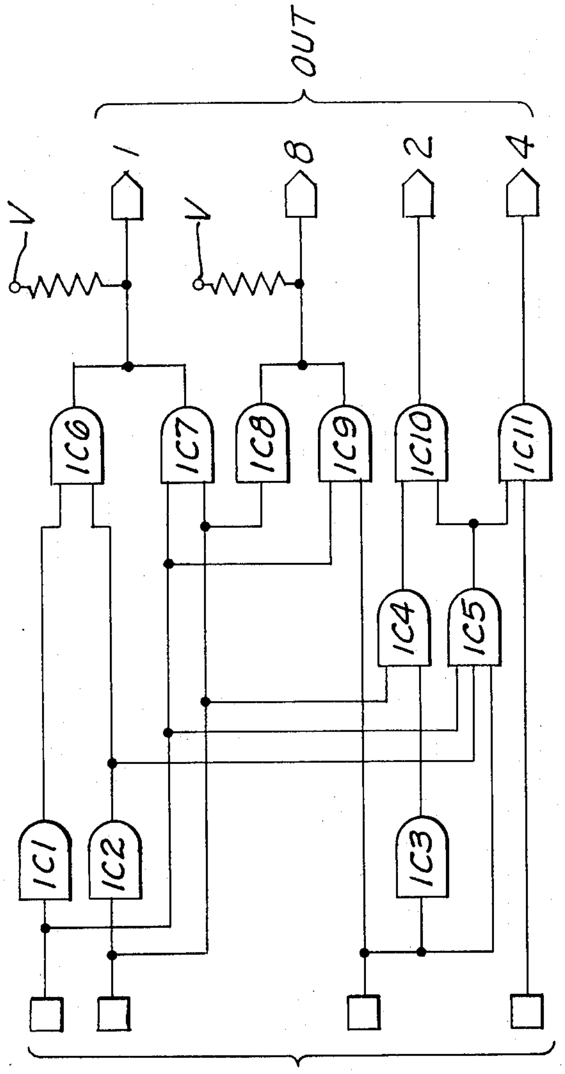
FIG. 4 is a schematic electrical diagram of one type of translating unit shown in FIG. 1.

Information retrieved from the upper margin field U, from the lower margin field L, and from the central field V, is temporarily transferred to the buffer memory of device Rm, each of those field sources of information in the set having or being assigned a section M1, M2 and M3, respectively, of the buffer memory. In accord with the invention, information passed into section M3 of the buffer unit may be in BCD form, for example, or Hollerith. Whereby such information may be put into a single code form usable uniformly in standard data processing machines, data storage devices, etc., translation means are utilized. The processing and storage devices are compatible with and use information supplied in a single standard code form, such as EBCDIC (Extended Binary Coded Decimal Interchange Code), for example. Accordingly, according to the invention, information stored in the set S in BCD form, or in Hollerith, is transferred to the buffer or reader memory Rm by the reader and is thence transferred via switching means Es (FIG. 1) to a selected appropriate one of a set of translating devices including TR1 and TR2, for example. TR1 may, for example, comprise circuitry effective to translate information from BCD code to EBCDIC code, and TR2 similarly, may comprise circuitry effective to translate from Hollerith code to EBCDIC, assuming that the information in the central field V of set S is, for example, and as indicated in FIG. 2, partly in Hollerith code form (F3) and partly in BCD code form (F2). In this example then, information comprised in field V, sub-field F2, encoded in 1, 2, 4, 8 BCD, will be routed via switch means Es to translator TR1 for conversion to EBCDIC form, a perforation having been omitted at location D which causes the switch to move to the indicated position. If a perforation had been sensed at location D, switch Es would have been moved to the lower (dash-line) position, to route Hollerith-coded information through translator TR2 for translation to EBCDIC form. In these examples TR1 would comprise circuitry such as that contained in an integrated circuit unit sold by National Semiconductor Corp., Santa Clara, California and denoted MM523JT, and TR2 would comprise circuitry similarly contained in a National Semiconductor unit denoted MM523JQ. Alternatively, translator units such as TR1 and TR2 may be six in number and may be such as that depicted diagrammatically in FIG. 4, wherein those integrated circuit (IC) gates having either two inputs or a single input (IC1, IC2, IC3, IC4, IC6, IC7, IC8, IC9, IC10 and IC11) may be Texas Instruments Corporation (TI) items SN 7400N, and those gates having three inputs (IC5) may be TI-SN 7410N units. In the latter examples, the six circuits like that of FIG. 4 serve as buffers or translators between the reader and a six-digit optical-display information readout device such as a commercial "NIXIE" display here comprised in unit DP. The noted SN 7400N and SN 7410N units with operational details are among the Series-74 transistor-transistor logic (TTL) modules described in detail in Texas Instruments, Inc., Catalog CC201 and available to the public through that company at P. O. Box 5012, Dallas, Texas 75222. As will be evident to those skilled in the information-processing circuit art, other commercially-available translating units similar to the cited examples may be substituted at TR1 and TR2 if translation from other than BCD and/or Hollerith is to be effected, or if translation to other than EBCDIC is to occur.

As was previously indicated, if the reader senses a perforation at location T but no perforation at K, the reader is stopped and activates a typewriter in unit TW (FIG. 1); and similarly if the reader senses a perforation at location K but none at T, a keyboard is activated in unit TW to permit keyboard input. If perforations are sensed at both of locations T and K, the keyboard unit is activated and the typewriter unit is rendered active. As previously noted if the reader senses an aperture at location M at the lower end of the leading-end field J, the reader is thereby programmed to read the lower edge field L plus the central field V, and if there is an edge-notch at location M, field L will be read and central field V will be ignored. Information read from the upper and lower edge fields U and L is passed to sections M1 and M2 of the reader memory and thence to the utilization device DP via translator unit TR3, as indicated in FIG. 1. Unit TR3 is selected from logical circuit devices commercially available and similar to units TR1 and TR2, in dependence upon the code used in notching the respective fields.

Figure 5:
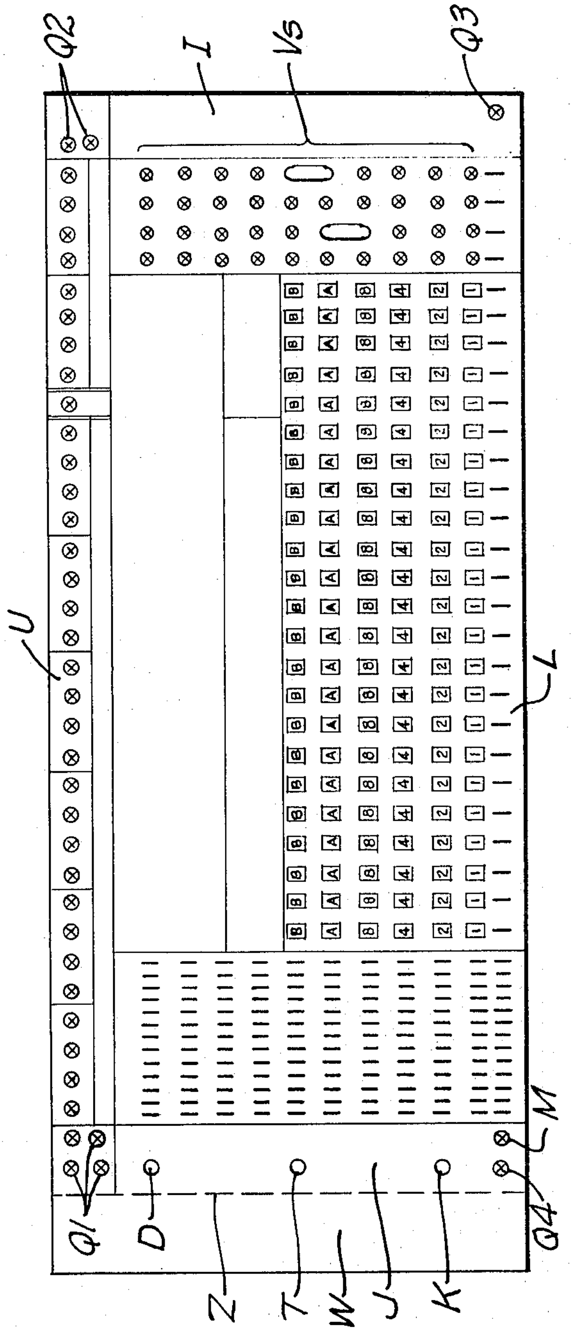
FIG. 5 is a face view of a form of set according to the invention, illustrating modified forms of information storage.

It should be noted that fields U and L may be subdivided into two or more sub-fields, or may in either instance extend along only a portion of the respective edge. For example (see FIGS. 3 and 5), if the set is employed for pathology-laboratory record purposes in a hospital or clinic, field U may be encoded in 1, 2, 4, 7 BCD code, with three sub-fields assigned to alpha code name, one sub-field to class of payment, one to class of professional service involved, one to a type of accommodation occupied, and a five-digit sub-field to nurse service, with the remaining four digit-locations each assigned to desired affirmative-negative items desirably recorded. In each location in field U in this example, a perforation is pre-punched, and information is recorded by notching, in accord with the teaching of the aforementioned U.S. Pat. No. 3,524,586. Since the set may comprise the base card and several sheets capable of percussion-recording of typed information, information can be recorded on the set by any or all of the several means mentioned, e.g., punching-notching device according to the noted patent, (commercially-available through Saber Management Systems, West Covina, California), typewriter, card-punch, etc., and the information added to at several different times and locations at which only inexpensive equipment is necessary. Further, the total information recorded prior to any selected time or station may be excerpted from the set at any location by removal of only one sheet member, leaving the remainder of the set intact for further recording at other times and/or locations. Also, retrieval of information from the notched field, the entire set, or from any component thereof, may be effected alternatively by needle manipulation with a set pack, or by automatic reader. Similarly needle-selection of only a specific class of sets from a pack of sets, for entry of additional information thereon, may be effected at any state and/or time. As is evident, the reader, whether a static reader or a dynamic reader, may be connected as previously indicated to furnish a visual display of desired portions of the data or information contained in a set being read. It is evident that when information is added to the record provided by a plural-member set, at different stations at respective different times, a portion of the set may be detached at each station, to thus provide ready access at any station to information entered in the set at that station and at other prior stations, while leaving the card portion or member of the set as a complete record for final processing at a central processing station. As is further evident, replacement of the card member of the set with all the information thereon is possible by duplicating the penultimate sheet member of the set when the latter is included for that purpose in the set. That is of value in event of loss or destruction of the base member or card of the set. Since it is contemplated that information may be added at the successive stations in increments, by edge-notching in one or both of fields U and L, it is evident that information added in either of those fields at any station may be retrieved at that station without necessity of a static or dynamic reader, by needle manipulation of the record pack at that station. Thus a fully-operable reader is in this exemplary use of the invention necessary at only the central or final station.

Further in accord with one aspect of the invention, information may be stored and sets may be sorted or information retrieved from a selected interior field utilizing needle manipulation, by punching out the material between any two vertically-aligned pre-punched aperture-locations in a selected sub-field of the central field V, either above, or below, an aperture. This is illustrated at sub-field Vs in FIG. 5, wherein apertures are pre-punched at all locations in the sub-field and the material between locations 5 and 6 in one column has been removed and wherein the material between locations 4 and 5 in another column has been removed. Thus sets having information so recorded may be easily sorted from all other sets in a set pack by insertion of a needle in the aligned apertures above, or below, the punched-out region and appropriately elevating or lowering the needle to raise or permit falling of the sets having the noted punched-out region. The sets having the material between perforations removed drop by gravitational action, relative to the remainder of the sets in the pack, and are thus positioned for easy removal from the pack. This in no significant manner adversely affects the information-storing ability of the sets, while adding considerably to the usefulness of the invention. The final member or members of the set, with information variously entered therein, will at a final station be subjected to reading by an optical-electronic and/or electronic reader, whether the set at that station comprises only the noted base card, or a base card and superposed tab-connected leaves or sheet members, and whether or not copies of information-additions effected at prior stations have been there retained by removal of one or more such sheet members.

Thus it is noted that the aforementioned objects of the invention have been fully attained. It is evident that in the light of the preceding description of a preferred system and method according to the invention, modifications and variations within the true spirit and scope of the invention will occur to others. Accordingly the scope of the invention is as defined by the appended claims.

We claim:

1. An information storing and utilizing system comprising:

first means, including an information store comprising a device in the form of a sheet-like set comprising at least one pre-punched card having a leading-end field having assigned locations thereon for perforation to define reading and information-disposition control at least one of pre-perforated upper and lower edge margin fields for storing of information by edge-notching and for alternative automatic electronic reading and manual needle-sorting from a pack of similar sets and at least one interior field having therein binary-coded information;

second means, including means for separately reading information in the said leading-end field of said set and information in the remaining fields of said set, said second means including switching means utilizing information retrieved from said leading-end field to control disposition of information stored in and read from said remaining fields of said set; and third means, including binary-code translating means, said third means connected to said second means for receiving binary-coded information retrieved from said first means by said second means, translate the information and transmit the translated information to means for utilizing such information.

2. A system as defined in clai 1, in which said set comprises a relatively stiff card member and at least one superposed flexible sheet member of substantially the same size, the members of said set each comprising a tab portion with means securing the tab portions together to form an integral multi-member set.

3. A system as defined in claim 1, in which said set has stored therein information coded in first and second different binary codes, and in which said translating means comprises first and second different binary decoder-encoder means each connected to said switching means for receiving therefrom information coded in a respective one of said binary codes.

4. An information store comprising a set comprising at least one pre-punched sheet of rectangular shape, said set having a detachable tab at a first end thereof and first and second pre-punched end-field portions containing information relating to and effective to prevent mispositioning of said set and effective to control disposition of information contained in the remainder of the set, said set having upper and lower marginal fields along the upper and lower margins and one of said fields having a series of pre-punched perforations adapted to be enlarged by further selective edge-notch punching to store information by coded edge notching for reading by electronic set-reading means and for selective needle sorting, said set further having at least one interior field having therein binary-coded information stored as one or more apertures in said interior field.

5. An information store as defined in claim 4, in which said set comprises a stiff card-like base member and a plurality of less stiff sheet-like members of similar shape superimposed upon said base member and all of the members of said set including a respective end tab portion all of which end tab portions are secured together to unite said members into an integral device from which respective free portions of said members may be individually removed to provide at respective different recording stations an individual record of information entered into said store at the respective station.

6. A method of processing information, said method comprising:

providing a pack of individual sets each set of which pack comprises at least one flat elongate pre-punched member having a plurality of fields including a leading-end field containing perforations in unique areal configurations for positional-control of the set and perforation-areas containing binary information effective for controlling disposition of information contained in binary form in another field of the set, and each of the sets of the pack including a margin-field having pre-punched apertures each arranged for edge-notching for recording and storing therein other binary information;

recording information in said one set by selectively altering the set by at least two of modes including marking, perforating and edge-notching at said pre-punched margin field;

retrieving information stored in said one set by a selected one of procedures including set-selection by needle-sorting of said set from said pack utilizing a needle manipulation at the location of a marginal edge-notch and set selection by electronic reading of information retrieved from said set by condition of prescribed locations in a leading-end field of said one set.

* * * * *